US007654740B2

(12) United States Patent
Behling et al.

(10) Patent No.: US 7,654,740 B2
(45) Date of Patent: Feb. 2, 2010

(54) X-RAY TUBE AND METHOD FOR DETERMINATION OF FOCAL SPOT PROPERTIES

(75) Inventors: Rolf Karl Otto Behling, Norderstedt (DE); Wolfgang Chrost, Hamburg (DE); Michael Lübcke, Hamburg (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 12/095,352

(22) PCT Filed: Nov. 27, 2006

(86) PCT No.: PCT/IB2006/054459

§ 371 (c)(1), (2), (4) Date: Sep. 24, 2008

(87) PCT Pub. No.: WO2007/063479

PCT Pub. Date: Jun. 7, 2007

(65) Prior Publication Data

US 2009/0067578 A1 Mar. 12, 2009

(30) Foreign Application Priority Data

Dec. 1, 2005 (EP) .................................. 05111585

(51) Int. Cl.
*G01D 18/00* (2006.01)

(52) U.S. Cl. ........................ 378/207; 378/125; 378/144

(58) Field of Classification Search ......... 378/119–144, 378/207
See application file for complete search history.

(56) References Cited

U.S. PATENT DOCUMENTS

| | | | | |
|---|---|---|---|---|
| 3,940,625 | A | 2/1976 | Hounsfield | 378/5 |
| 4,675,892 | A | 6/1987 | Plessis et al. | 378/145 |
| 5,065,420 | A | 11/1991 | Levene | 378/137 |
| 5,469,429 | A | 11/1995 | Yamazaki et al. | 378/19 |
| 6,438,207 | B1 | 8/2002 | Chidester et al. | 378/138 |
| 2002/0101958 | A1 | 8/2002 | Bertsche | 378/143 |

FOREIGN PATENT DOCUMENTS

| | | | |
|---|---|---|---|
| DE | 19633860 | A1 | 2/1997 |
| EP | 1132943 | A2 | 9/2001 |
| GB | 2069129 | A | 8/1981 |

*Primary Examiner*—Courtney Thomas

(57) ABSTRACT

X-ray tube and method for determination of focal spot properties The invention relates to an x-ray tube (1) comprising at least one cathode (3) which emits electrons accelerated towards a rotating anode (5) such that the focal spot (27) is formed on a surface (9) of the anode (5). A structure (15), in particular slits or pits (13), is disposed on the surface (9) of the anode (5). The x-ray tube (1) comprises a detector (7) for detecting a detection signal which changes, if the structure (15) on the rotating anode (5) passes the focal spot. The x-ray tube (1) further comprises determination means (6) for determining properties of the focal spot from changes of the detection signal. Thus, properties of the focal spot can be determined from changes of the detection signal during operation of the x-ray tube (1).

14 Claims, 8 Drawing Sheets

X-RAY TUBE AND METHOD FOR DETERMINATION OF FOCAL SPOT PROPERTIES

Figure 1:
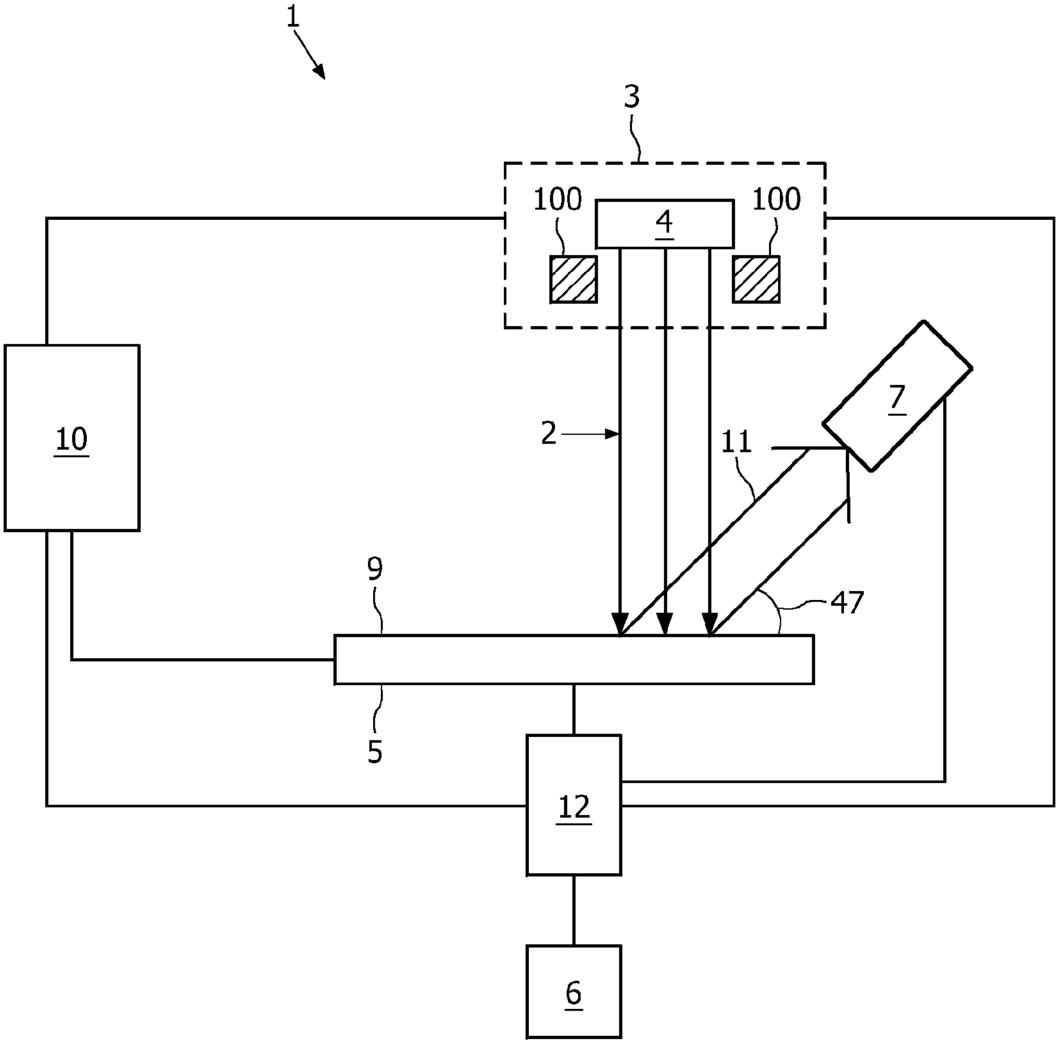

The invention relates to an x-ray tube comprising at least one cathode which emits electrons accelerated towards a rotating anode such that a focal spot is formed on a surface of the anode wherein the properties of the focal spot can be determined. The invention relates further to a method for determination of properties of the focal spot on the rotating anode as well as to a computer program for controlling the x-ray tube.

The performance of an x-ray tube depends strongly on the properties of the focal spot. For example, the x-ray photon flux depends on the flux of electrons impinging on the focal spot, i.e. e.g. on the electron current density distribution across the focal spot and the dimensions or the position of the focal spot. These electrons impinging on the focal spot are also called "primary electrons". Furthermore, in computed tomography the position of x-rays emanating from the focal spot and detected by a detector element is crucial for the quality of a reconstructed image.

Since the properties of the focal spot can alter during operation, it is an object of the invention to provide an x-ray tube wherein the properties of the focal spot on the rotating anode can be accurately determined during operation.

This object is achieved by an x-ray tube comprising a rotating anode having a structure on its surface for determination of properties of a focal spot, at least one cathode for emitting electrons accelerated towards the anode such that the electrons impinge on the surface of the rotating anode and form the focal spot, a detector for detecting a detection signal which changes, if the structure on the rotating anode passes the focal spot and determination means for determining properties of the focal spot from changes of the detection signal.

The invention is based on the idea that changes of a detection signal, which are caused by a structure on a rotating anode, when the structure passes a focal spot, contain information about the properties of the focal spot. Thus, by analyzing the changes of the detection signal, properties of the focal spot can be determined.

The x-ray tube according to the invention has the advantage that properties of the focal spot can be determined during operation.

For example, if this x-ray tube is used in a computer tomograph, the determined focal spot properties, especially the dimensions, position and the electron current density distribution, can be used in a reconstruction algorithm. Since the intensity of x-rays traversing an object which has to be examined in the computer tomograph and the position of x-rays are crucial for the quality of the reconstructed image, the consideration of focal spot properties, which have been measured during operation, in the reconstruction algorithm will improve the image quality.

Furthermore, because of the determination of the focal spot properties during operation, the focal spot can be controlled during operation in a way that a deviation of the focal spot properties, e.g. the position or the dimensions, which are determined during operation, from preselected focal spot properties will be corrected by changing control parameters of the x-ray tube, e.g. by modifying focusing means for the electron beam. This allows for reduction of various reserves which are provided for safety reasons. For example, in general, the area of the surface of the anode is larger than technically required because during operation the focal spot can be off a desired track and could damage the envelope of the x-ray tube. According to the invention, a deviation of the focal spot position and dimensions can be corrected during operation, which allows for a smaller area of the surface of the anode.

The determination of the focal spot properties during operation allows further to control these properties to maintain a minimized spot size which improves the quality of reconstructed images, e.g. if the x-ray tube is used in a computer tomograph. Furthermore, if the electron current density, i.e. the detection signal, decreases, the tube voltage and/or the tube current can be increased to improve the image resolution of a reconstructed image.

In a preferred embodiment, particles emanating from the focal spot, in particular x-ray photons, backscattered electrons and/or evaporated metal particles, are detected yielding detection signals with a large signal-to-noise ratio which improves the accuracy of determined properties of the focal spot.

In a further preferred embodiment, the structures are formed such that particles emanating from the focal spot, while the structure passes the focal spot, reach the detector means with a lower probability than particles emanating from the focal spot, while the structure does not pass the focal spot. This leads to changes in the detection signal, which can be well detected, whereby the quality of the determined properties of the focal spot is further improved.

It is also preferred that the determination means is adapted to determine the properties of the focal spot depending on the time period during which a change of the detection signal is detected and/or the magnitude of the change which allows for a simple determination of the properties.

In another preferred embodiment, the structure comprises at least one radial slit and/or at least one radial groove, and the determination means is adapted to determine the width of the focal spot in azimuthal direction depending on the time period during which a change of the detection signal is detected. This results in a facilitated determination of the width of the focal spot.

It is also preferred that the determination means is adapted to determine the focal spot width current distribution depending on the change of the detection signal measured at different azimuthal positions of the slit, while the slit passes the focal spot, which yields a simple determination of the focal spot width current distribution.

The focal spot width current distribution is the focal spot current distribution in width direction, i.e. the electron current density on the anode, integrated along the radial direction, for different azimuthal positions.

It is further preferred that the structure comprises pits which are offset to each other in radial and azimuthal direction and that the determination means is adapted to determine the length of the focal spot in radial direction depending on a radial range spanned by the pits which cause the change of the detection signal. This results in a simple determination of the length of the focal spot.

In another preferred embodiment the determination means is adapted to determine the focal spot length current distribution depending on the change of the detection signal measured when different pits, which are arranged at different radial positions, pass the focal spot. This leads to a simple determination of the focal spot length current distribution.

The focal spot length current distribution is the focal spot current distribution in length direction, i.e. the electron current density on the anode integrated along the azimuthal direction for different radial positions.

It is further preferred, that the structure comprises at least one portion of at least one spiral groove and that the determination means is adapted to determine the length of the focal spot in radial direction depending on a radial range spanned by the at least one portion of the at least one spiral groove which is overlapped with the focal spot and which causes the change of the detection signal and/or to determine the focal spot length current distribution depending on the magnitude of the change of the detection signal. If such a portion of a spiral groove overlaps with the focal spot, the detection signal comprises a continuous elongated drop. Since each point in time during this continuous elongated drop corresponds to a radial position, the length of the focal spot in radial direction can easily be determined from the temporal length of this continuous elongated drop. Furthermore, the determination of the focal spot length current distribution depending on the magnitude of the change of the detection signal can easily be determined from the magnitude of this continuous elongated drop at different temporal, i.e. radial, positions.

In addition, it is preferred that the structure comprises at least one slit and/or at least one groove with varying width in radial direction and that the determination means is adapted to determine the radial position of the focal spot depending on the time period during which a change of the detection signal caused by the at least one slit and/or groove with varying width in radial direction is detected and/or depending on the magnitude of this change. This results in a simple determination of the focal spot position.

It is further preferred that the detector is adapted to detect x-rays emanating from the focal spot and that the detector consists of a multiple of sub detectors each of which comprises a different attenuating device and has a different range of sensitivity. This allows to select the sub detector with the appropriate attenuation depending on the intensity of the detection signal. For example, if particles emanate from the focal spot and if the detection signal is out of range because the intensity of particles is to low or to high, another sub detector having the appropriate attenuation can be used. This improves the quality of the measured changes of the detection signal and, thus, the quality of determined properties of the focal spot.

It is preferred that the determination means is adapted to sample the detection signal over more than one time period of the detection signal. Since the anode comprising the structure rotates and since the structure overlaps with the focal spot several times in the same way, the detection signal will be periodic. Thus, sampling the detection signal over more than one time period will increase the signal-to-noise ratio which will improve the quality of the determined properties of the focal spot.

The object is further achieved by a method for determination of properties of a focal spot of an x-ray tube on a rotating anode having a structure on its surface comprising the steps of rotating the anode, forming the focal spot on the rotating anode by emitting electrons from at least one cathode and by accelerating the electrons towards the anode such that the electrons impinge on the surface of the rotating anode and form the focal spot, detecting a detection signal which changes, if the structure on the rotating anode passes the focal spot, determining properties of the focal spot from changes of the detection signal.

In addition, the object is achieved by a computer program for controlling means for controlling the x-ray tube according to the steps of the method for determination of properties of the focal spot of the x-ray tube on the rotating anode having a structure on its surface.

Figure 2:
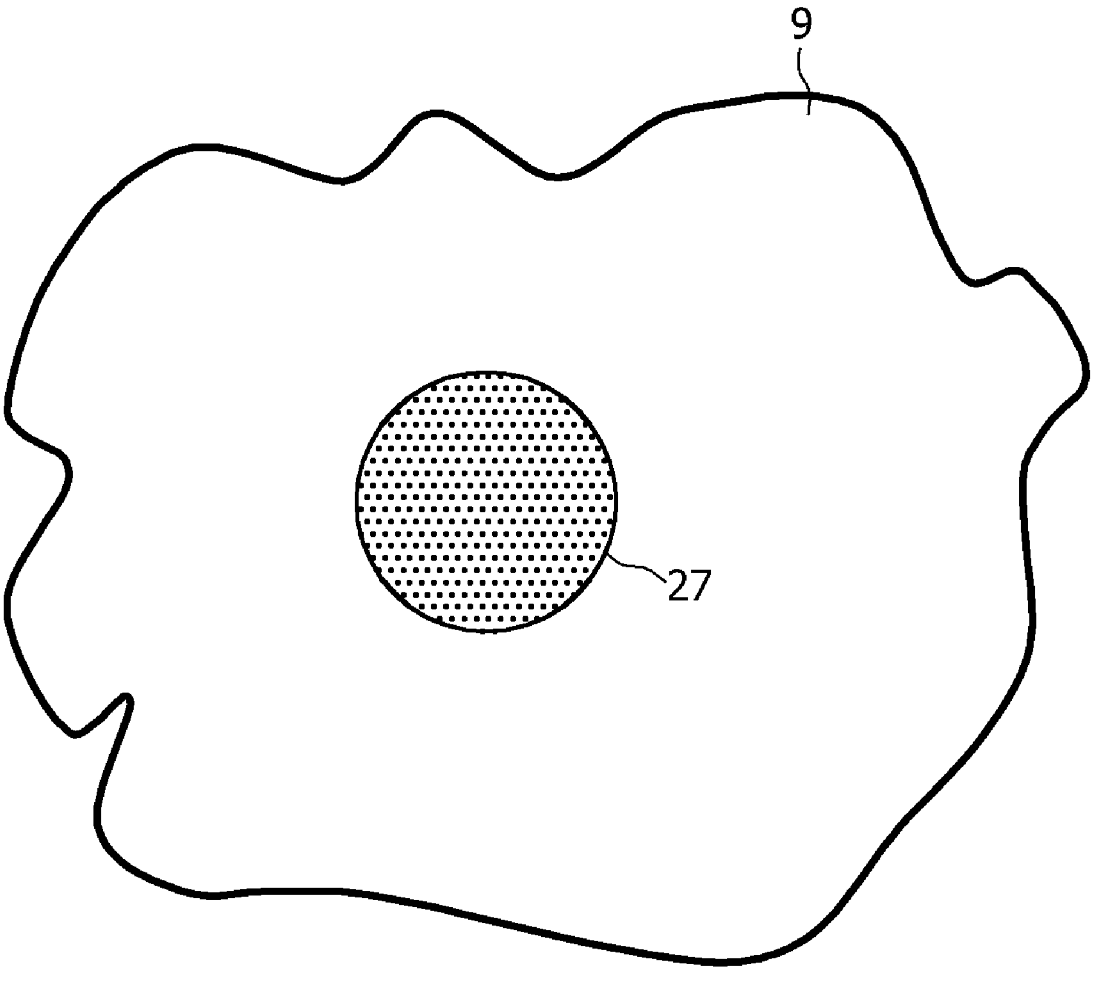
Figure 3:
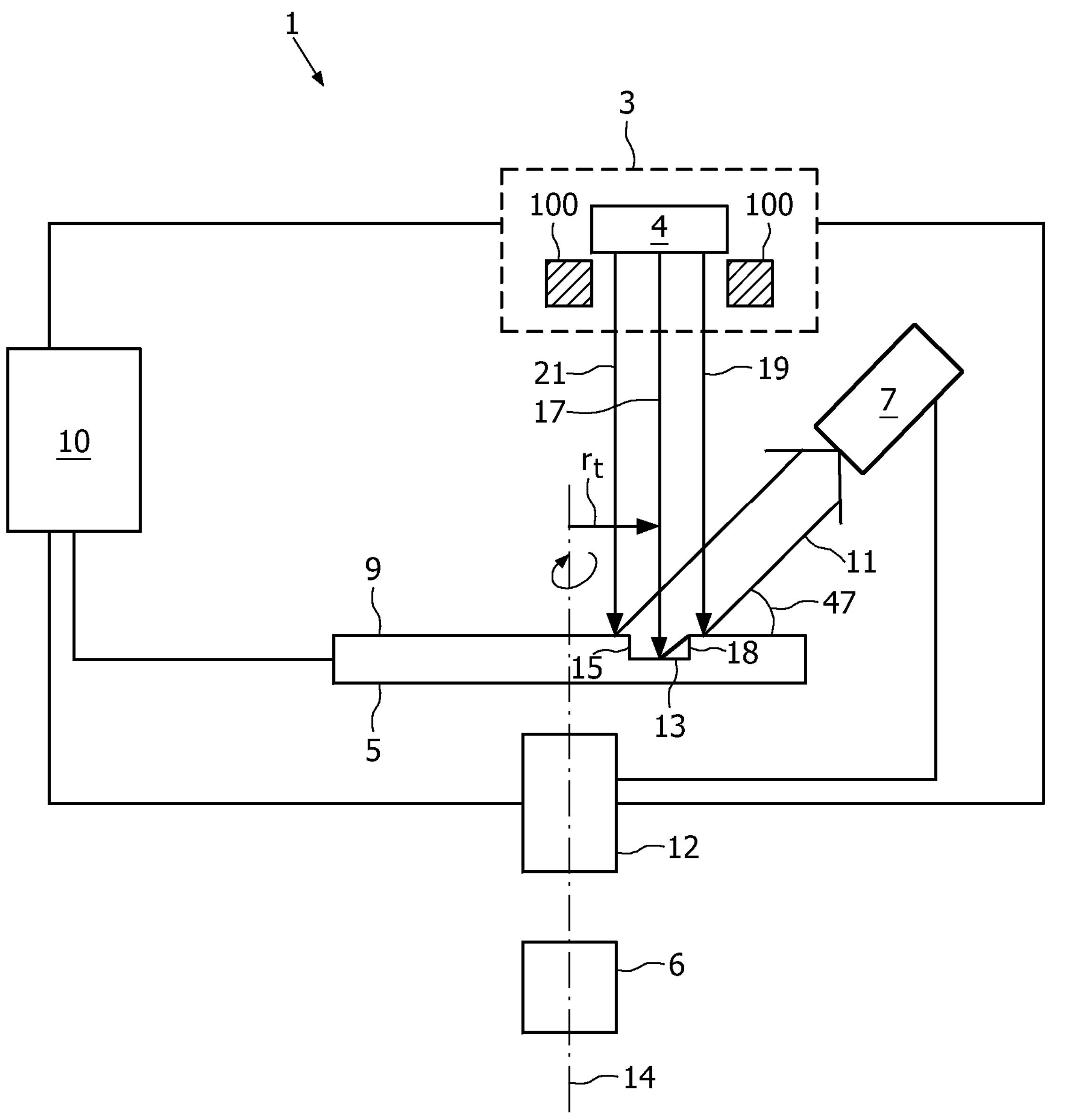
Figure 4:
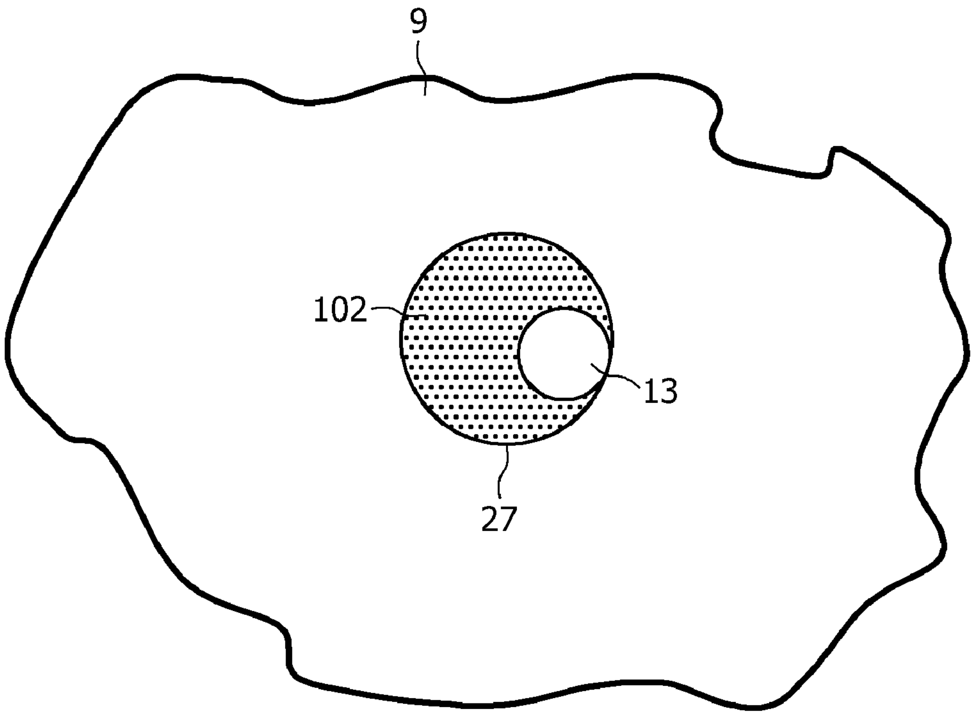
Figure 5:
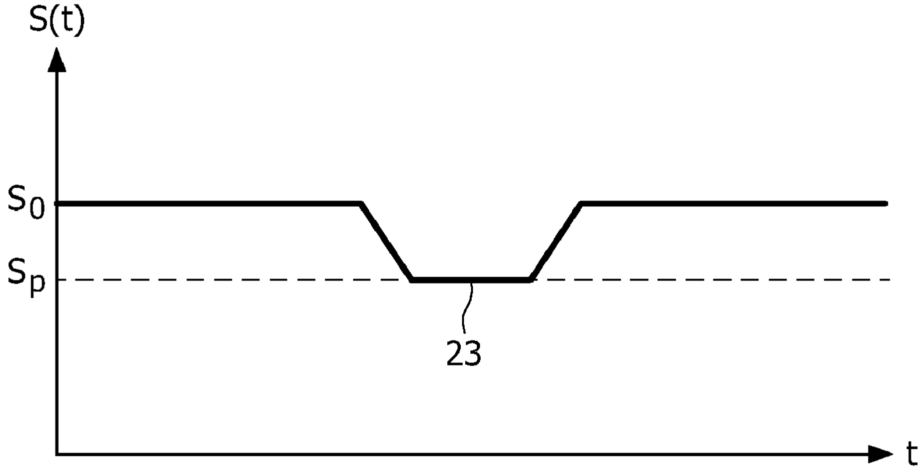
Figure 6:
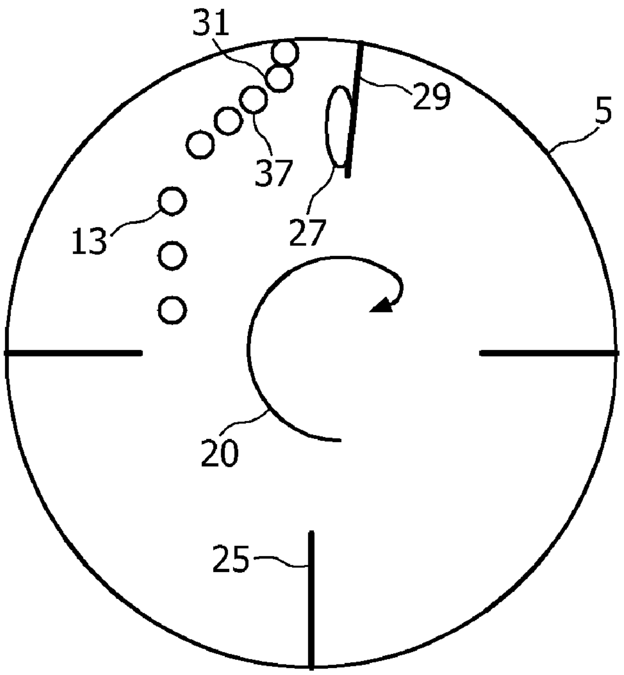
Figure 7:
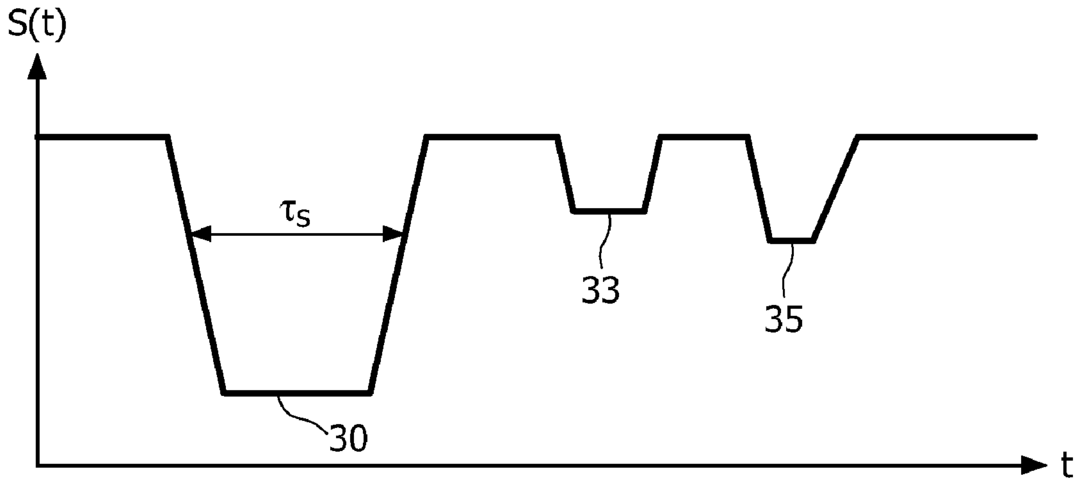
Figure 8:
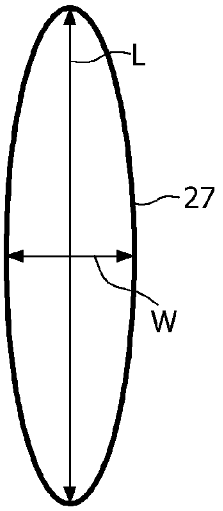
Figure 9:
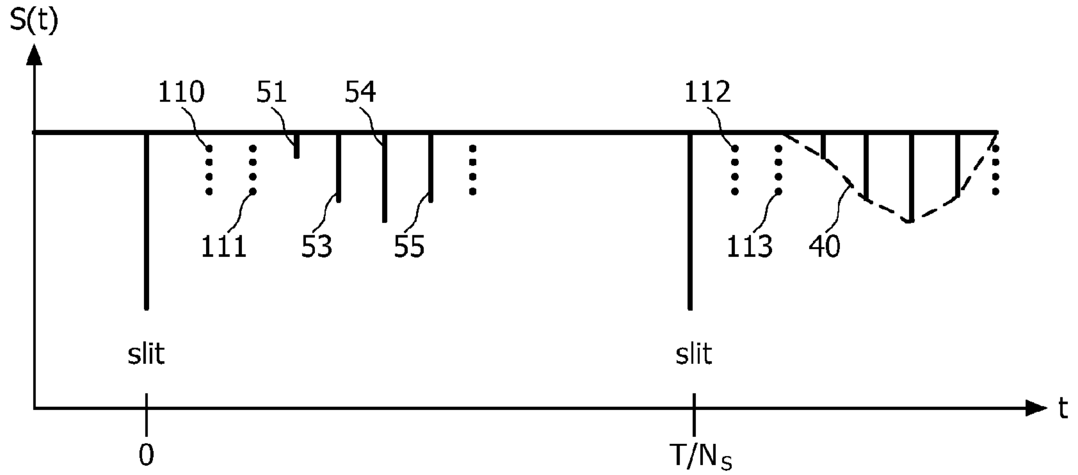
Figure 10:
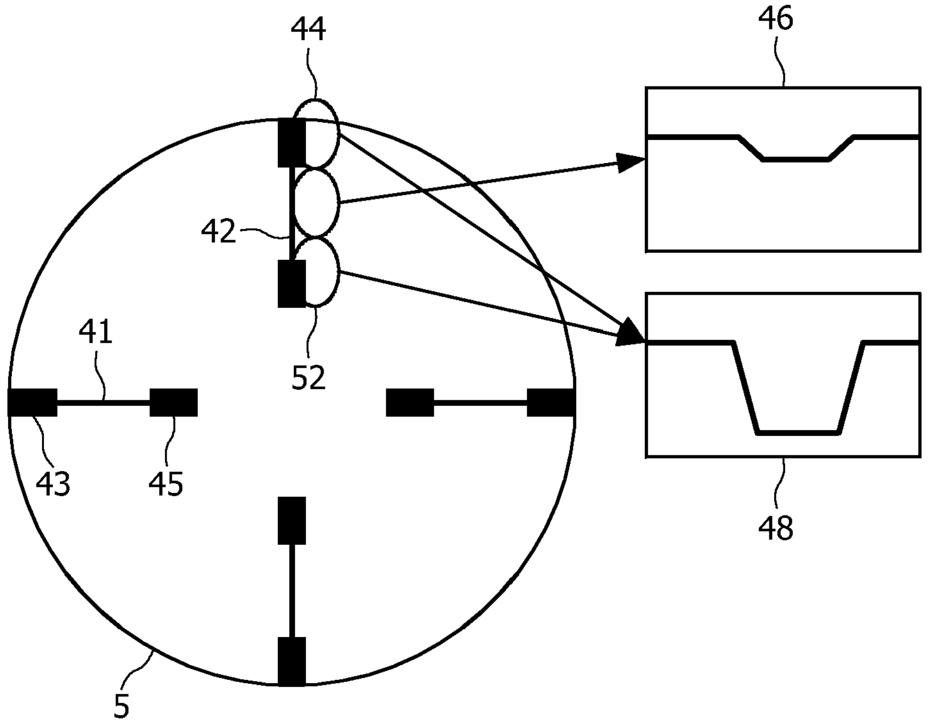
Figure 11:
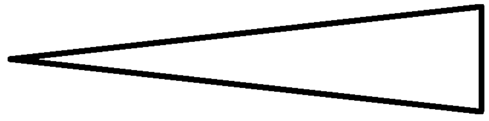
Figure 12:
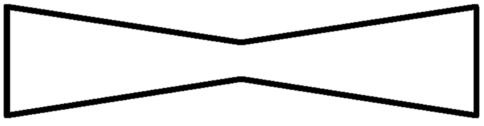
Figure 13:
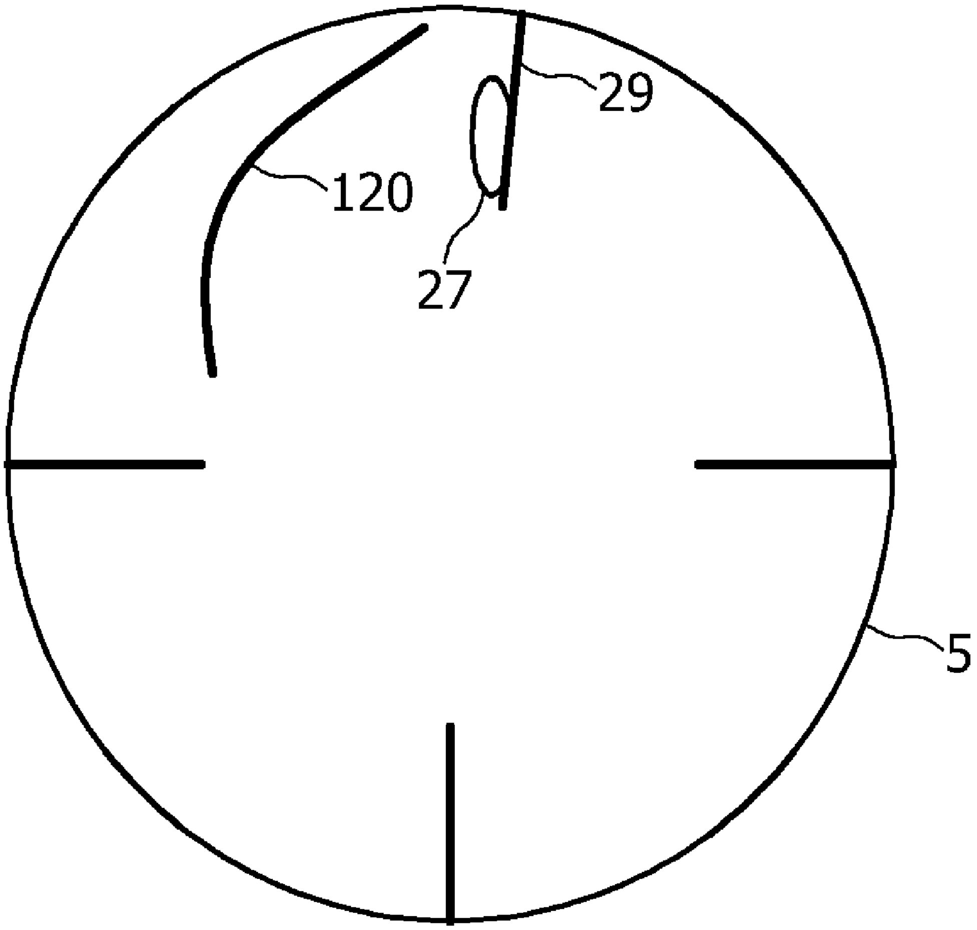

In the following, the invention will be described in detail with reference to the drawings, wherein FIG. 1 schematically shows an x-ray tube according to the invention in a situation in which a structure of an anode does not pass a focal spot, FIG. 2 schematically shows the focal spot, when a structure on the anode does not pass the focal spot, FIG. 3 schematically shows the x-ray tube in a situation in which a structure of the anode passes the focal spot, FIG. 4 schematically shows the focal spot, when a structure on the anode passes the focal spot, FIG. 5 shows a time varying detection signal with a temporal dip, when a structure on the anode passes the focal spot, FIG. 6 schematically shows the anode with structures comprising slits and pits, FIG. 7 schematically shows a time varying detection signal when the structure comprising the slits and pits passes the focal spot, FIG. 8 shows the dimensions of the focal spot, FIG. 9 shows another schematic view of the detection signal depending on time when a structure comprising slits and pits passes the focal spot, FIG. 10 schematically shows different focal spot positions on the anode and slits with varying width, FIG. 11 shows a shape of a slit with varying width, FIG. 12 shows another shape of a slit with varying width, and FIG. 13 schematically shows another anode with a structure comprising slits and a portion of a spiral groove.

FIG. 1 schematically shows an x-ray tube 1 according to the present invention. The x-ray tube 1 comprises a cathode 3, a rotating anode 5, a detector 7, a high-voltage source 10, a determination unit 6 and a control unit 12 (controlling means). The cathode 3 includes electron emitting means 4 and focusing means 100 to focus the electron beam 2 on a predefined location in predefined dimensions on the anode 5. The electron emitting means 4 emits an electron beam 2 comprising electrons accelerated towards the anode 5 by an electric field generated by the high-voltage source 10. The electrons impinge on the top surface 9 of the anode 5 and form a focal spot. X-rays 11 emanate from the focal spot and are detected by the detector 7 which generates a detection signal. This detection signal is used by the determination unit 6 to determine properties of the focal spot. These focal spot properties are, e.g., the dimensions or the position of the focal spot. The determination unit 6 is adapted to determine the properties of the focal spot according to the methods and correlations between the changes of the detections signal and these properties described further below. The anode 5, the cathode 3, the high-voltage source 10, the detector 7 and the determination unit 6 are controlled by the control unit 12.

The focal spot 27, schematically shown in FIG. 2, does not overlap with a structure 15 (shown in FIG. 3) on the top surface 9 of the anode 5. Thus, in FIG. 2 showing a portion of the top surface area 9, the part of the top surface area 9 of the anode 5, which is underneath the focal spot 27, is being hit resulting in an unattenuated detection signal $S_0$.

The line of sight of the detector 7, i.e. the straight line between the focal spot and the detector 7 which follows the x-rays 11 in FIGS. 1 and 3, encloses an acute angle 47 with the top surface 9 of the anode 5. The detector 7 and the focal spot 27 are arranged such that the angle 47 is as small as possible, wherein the detector 7 can still detect x-rays emanating from the focal spot. This will result in an improved sensitivity of the detection signal with respect to changes on the top surface 9 of the anode 5, i.e. with respect to the structure 15.

Alternatively or additionally, the detector 7 can be adapted to detect other particles, like electrons or metal particles, emanating from the focal spot. Also in this case, the detector 7 and the focal spot 27 are arranged such that the angle 47 is as small as possible, wherein the detector 7 can still detect these particles emanating from the focal spot.

In another preferred embodiment, the detector 7 comprises multiple sub detectors each of which comprises a different attenuating device and has a different range of sensitivity. Each sub detector has a detection surface wherein different sub detectors have x-ray absorbing materials of different thicknesses which are arranged such that they attenuate the x-rays before they meet the respective detection device. Thus, depending on the used x-ray intensities the sub detector with the appropriate x-ray attenuation can be automatically selected, e.g. by the control unit 12 or by a selection unit, which is connected with the detector 7 and changes the sub detector, when the detection signal is out of the dynamic range of the current sub detector. This is particularly beneficial, if the x-ray tube is used with a wide range of tube currents (e.g. 1 mA to 2 A) and tube voltages (e.g. between 25 kV and 150 kV).

The control unit 12 switches the high-voltage source 10 off, if the detection signal is outside a predetermined range to prevent damage of the x-ray tube 1.

FIG. 3 shows schematically the x-ray tube 1 in a situation in which a pit 13 of the structure 15 overlaps with the focal spot. The electron rays 19 and 21 impinge on the top surface 9 of the anode 5, whereas the electron ray 17 of the electron beam 2 impinges on the bottom of the pit 13 resulting in x-rays emanating from the bottom which reach the detector 7 with reduced probability, e.g. because they are attenuated by the edge 18 of the anode 5.

FIG. 4 shows a focal spot 27 in the situation illustrated in FIG. 3. In the focal spot 27 the pit 13 is hit by the electrons of the electron beam 2. X-rays emitted from the pit 13 are attenuated before they reach the detector 7, or they do not reach the detector 7. From the portion 102 of the focal spot, which is not overlapped with the pit 13, x-rays are emitted, which are not attenuated by the anode when they reach the detector 7. The passage of the structure 13 leads to a detection signal $S_p$, which is smaller than the detection signal $S_0$. The resulting dip 23 in the detection signal intensity is schematically shown in FIG. 5, which illustrates the dependency of the detection signal S(t) on the time t.

The FIGS. 3 and 4 show only schematically situations, in which the focal spot 27 is overlapped with a pit 13 or not. Since these figures are only schematic, in FIGS. 3 and 4, the focal pot 27 is circular only for illustration purposes. Thus, the invention is not limited to this special shape of the focal spot 27. For instance, the focal spot 27 can also have an oval shape, as shown in FIGS. 6, 8, 10 and 13.

The anode structure 15 comprises several pits 13 and slits 25 (FIG. 6) wherein, instead of slits, also grooves can be used. The slits 25 are arranged radially with respect to the dish-like anode 5, and the width of these slits 25 in azimuthal direction is smaller than the width of the focal spot 27 in azimuthal direction, in particular the width of the slits 25 is much smaller than the width of the focal spot 27, i.e. 10-, 20-, 50- or 100-times smaller. The slits 25 are arranged in azimuthal direction preferably equidistantly to each other. The dips 13 are disposed offset to each other in radial and azimuthal direction. The pits 13 are circular and identical and comprise a diameter which is smaller than the length of the focal spot 27, in particular the diameter of the pits 13 is much smaller, i.e. 10-, 20-, 50- or 100-times smaller. The azimuthal distance of the centers of adjacent pits is smaller than the azimuthal width of the focal spot at the radial position of each particular pit.

In the following, with reference to FIG. 7, the correlation between the overlap of the slits 25 and pits 13 with the focal spot 27 and the resulting detection signal S(t) is illustrated. During operation the anode 5 rotates in the direction indicated by the arrow 20 and the pits 13 and slits 25 pass the focal spot 27 yielding dips in the detection signal S(t) which is schematically depicted in FIG. 7. When the slit 29 passes the focal spot 27 the dip 30 occurs in the detection signal S(t). Then the pit 31 passes the focal spot 27, but is not completely overlapped with the focal spot 27 resulting in a dip 33 of the signal S(t) which is smaller than the dip 35 resulting from the maximal overlap of the pit 37 with the focal spot 27.

From this sequence of dips in the detection signal S(t) the determination unit 6 determines properties of the focal spot 27 during operation. This will be explained in the following in more detail.

Under the assumption that the probability of detecting particles emitted from a pit, slit or groove under the focal spot is exactly zero, the magnitude of the resulting dip in the detection signal is proportional to the intensity distribution in the primary electron beam, i.e. the electron beam 2, at the cross section with the target surface integrated in radial direction across the surface area of the pit or slit. The detection signal changes with the area of overlap of the primary electron beam and the structure. The electron beam intensity distribution integral is represented by V(ϕ), wherein ϕ indicates the azimuthal position of the slit or pit, i.e. the azimuthal center of the slit or pit, at a given point t in time. The detection signal $S_\phi(\phi)$ as a function of ϕ can be expressed as a convolution of the radially integrated beam intensity distribution V(ϕ) and a probe function. The index ϕ of $S_\phi(\phi)$ denotes that the detection signal $S_\phi(\phi)$ is a function of the azimuthal position. The term "probe function" is well known from the theory of linear systems and describes the characteristics of a probing element (in this case a slit or pit passing the focal spot) in a signal measurement chain and relates the temporal or spatial input signal to the output signal. The probe function takes the form of an integration kernel, wherein the output signal S (the result of the measurement) is the convolution integral of the integration kernel k and the input signal V:

$$S_\varphi(\varphi) \sim \int_0^{2\pi} k(\varphi, \varphi') * V(\varphi') d\varphi'. \tag{1}$$

The determination of probe functions for a given probing element is well known by skilled persons. For example, for a slit following probe function can be determined:

$$k_s(\varphi, \varphi')_s = \begin{cases} 1 & \text{for } |\varphi - \varphi'| < \frac{W_s}{2}, \\ 0 & \text{else} \end{cases} \tag{2}$$

wherein $W_s$ is the angular width of the slit in azimuthal direction. As the slit rotates with ϕ=ωt, this translates into a temporal signal S(t). The input signal V(ϕ) (radially integrated beam intensity distribution) can be determined by transforming the temporal detection signal S(t) into a signal $S_\phi(\phi)$ using ϕ=ωt and by a deconvolution with respect to equation (1). Thus, the radial integral V(ϕ) of the electron current density function $j(\vec{r})$ can be calculated using a transformation from S(t) to $S_\varphi(\varphi)$ and a deconvolution of the detection signal, knowing the probe function.

Under the assumption that the slit width and the diameter of the pits are much smaller than the width of the focal spot, following correlations between the detection signal and the focal spot properties are deduced.

Under the further assumption that the current density distribution within the electron beam 2 is homogenous ($j(\vec{r})$=const), wherein $\vec{r}$ is a two-dimentional position vector in the anode surface plane, the focal spot width W (full width half maximum, see FIG. 8) in azimuthal direction can be determined by following equation:

$$W=2\pi r_t \tau_s / T, \quad (2)$$

wherein $\tau_s$ is the temporal full width half maximum of a dip 30 which corresponds to a slit 29, wherein T is the time period for one full rotation of the anode 5 and wherein $r_t$ is the radius of the focal spot track from the center of the anode 5 to the center of the focal spot 27.

Under the assumption that the azimuthal distance of the centers of adjacent pits is larger than the width of the focal spot at the particular radial position of the pit, and therefore that the corresponding dips in the detection signal can be distinguished from each other, the focal spot length L (full width half maximum, see FIG. 8) in radial direction can be determined according to following equation:

$$L=N_p d_p. \quad (3)$$

The meanings of the variables used in equation (3) are explained with reference to FIG. 9 showing another schematic sequence of detection signals S(t). The variable $N_p$ is the number of dips in the detection signal caused by adjacent pits during one passage of the pits across the focal spot 27 (registered pits, lines 51, 53, 54, 55 in FIG. 9), and the variable $d_p$ is the radial distance between adjacent pits. In FIG. 9 the variable $N_s$ is the number of slits on the anode.

Since each temporal position of ignored or not ignored pits corresponds to a radial position of the pits, the focal spot position can be determined from the pattern of ignored and not ignored pits. For example, in FIG. 9, the focal spot is distributed over a radial range spanned by the pits 51, 53, 54, 55, thus, the radial focal spot position corresponds to this radial range. The temporal positions 110, 111, 112, 113 of the ignored pits are indicated in FIG. 9 with dotted lines.

The focal spot outer edge OE can be determined from the following equation $$OE=r_i \text{ with } i=1+I_p, \quad (4)$$

wherein $r_i$ is the distance between the center of the anode and the center of the i-th pit, wherein the index i of the pits increases with decreasing distance to the center of the anode.

Furthermore, from the pits 110, 111, which are ignored before the first not ignored pit 51 is recognized, the largest index i of these ignored pits 110, 111 is identical to the index $I_p$. Thus, $I_p$ is the largest index of the ignored pits of a sequence of pits, which are ignored, before the first not ignored pit is detected. The positions of the ignored pits, i.e. the distance between the center of the anode and the center of the i-th pit are known from the construction of the anode.

The focal spot inner edge IE can be determined according to following equation:

$$IE=r_i \text{ with } i=N_p+I_p. \quad (5)$$

The focal spot width current distribution $CD_w$ is the electron current density on the anode, integrated along the radial direction, for different azimuthal positions, i.e. for different points in time, wherein the different points in time are points in time at which the slit passes the different azimuthal positions. This focal spot width current distribution is proportional to the difference between the detection signal $S_0$ measured, when the slits on the anode do not pass the focal spot, and the detection signal $S_s(t)$ measured at the different points in time, i.e. at the different azimuthal positions in the focal spot, when the slit passes the focal spot. The focal spot width current distribution corresponds to slit camera exposure for standardized size measurement according to IEC 60336 and can be determined according to following equation:

$$CD_w=\text{const}\cdot(S_s(t)-S_0). \quad (6)$$

In a similar way, the focal spot length current distribution (corresponding to the blackening pattern using a slit camera exposure for standardized measurement of the focal spot size according to IEC 60336, which measures the size projected on a plane perpendicular to the central ray of the x-ray tube after mapping it back to the physical target surface) is the electron current density on the anode integrated along the azimuthal direction for different radial positions. This focal spot length current distribution is proportional to a contour line 40 which encloses the dips in the detection signal caused by the registered pits wherein each point in time, at which a pit is registered, corresponds to the radius of the position of the center of the respective registered pit, i.e. corresponds to one of the different radial positions.

It should be mentioned, that besides x-rays and electrons, other particles which emerge from the surface 9 of the anode 5 upon passage of the electron beam can be used to probe the characteristics of the focal spot and the corresponding target surface. For example, by measuring the time varying metal vapor pressure signal, the temperature of the focal spot 27 can be determined.

In another preferred embodiment according to the invention the width of at least one slit varies in radial direction for determination of the radial position of the focal spot 27. As shown in FIG. 10, the width of the mid portion 41 of the slit which passes the focal spot 27, when the focal spot is positioned correctly (focal spot position 42), is smaller than the width of the portions 43, 45 of the slit which pass the focal spot 27, when the focal spot is not correctly positioned (focal spot positions 44 and 52). This leads to a dip in the detection signal which is larger (see inset 48 in FIG. 10), when the focal spot is not correctly aligned, than the dip in the detection signal, which is detected, when the focal spot is correctly positioned (see inset 46 in FIG. 10). Thus, if the detection signal exceeds a predefined threshold value, which is caused by a incorrect positioning of the focal spot, the control unit can output a corresponding failure message and switch off the x-ray tube.

In other preferred embodiments, the shape of the slits is triangular (FIG. 11) or double triangular (FIG. 12). Slits with the triangular shape according to FIG. 11 generate dips of the detection signal, whose temporal width and magnitude varies depending on the radial position of the focal spot. A dip generated, when a portion of a slit having a larger slit width passes the focal spot, has a larger temporal width and a larger magnitude than a dip, which is measured, when a portion of the slit having a smaller width passes the focal spot. Thus, the radial position of the focal spot can be determined depending on the temporal width and/or the magnitude of a dip. For example, since each temporal width and magnitude of a dip corresponds to a special width of the slit, i.e. to a special radial position, this radial position can easily be determined. Also when the double triangle slit is used, dips of the detection signal, which are measured when a portion of the slit having a larger width passes the focal spot, have a larger temporal width and magnitude than dips of the detection signal which are measured, when a portion of the slit having a smaller width passes the focal spot. Thus, the deviation from a center position can be determined according to the temporal width and/or the magnitude of the detection signal dip caused by the slit.

Since the detection signal is periodic, the detection signal is sampled over more than one time period to improve the signal-to-noise ratio, wherein the sample time period is the time period which is needed for e. g. one full rotation of the anode. Alternatively, the time period between two dips of the detection signal caused by the passage of adjacent slits can be used as the sample time period.

In another preferred embodiment, the control unit 12 is adapted to control the x-ray tube 1 such that a deviation of determined properties of the focal spot (27) from predefined properties of the focal spot is corrected.

The periodicity of the signals can also be used to determine the anode speed of rotation. The time period of rotation is equal to the time period of the detection signal caused by the structure, in particular caused by the slits of the anode.

In another embodiment the shape of a single pit is elongated in radial direction. It is further preferred that the ratio of the radial length and the azimuthal width of pits is substantially equal to the corresponding ratio of the focal spot to maximize the detection signal and to obtain a spatial resolution which is almost equal for both projected focal spot directions (projected onto the plane of the radiation port, which is perpendicular to the center ray of the x-ray tube, see e.g. IEC 60336).

In another embodiment according to the invention, referring to FIG. 13, instead of pits a portion of a grooved spiral line 120 is used, which is disposed in the surface 9 of the anode 5 and which passes the focal spot 27 during rotation of the anode 5. Referring to FIG. 9, the detection signal is then a continuous elongated drop having the form of the contour line 40. The temporal length of the elongated drop is equal to the time period in which the groove overlaps with the focal spot. This is a measure of the length of the focal spot, if the spiral lead of the portion of the spiral groove is sufficiently flat, i.e. if the difference of the azimuth angle between the first and the last point of intersection, where the portion of the spiral groove overlaps with the focal spot, is large, preferably at least 10 times larger, further preferred 20 times larger, still further preferred 30 times larger, compared to the azimuthal extension (width direction) of the focal spot measured at the focal track, in particular compared to the full width half maximum of the focal spot. In this case, the temporal length of the elongated drop is approximately proportional to the length of the focal spot. Furthermore, in this case, the magnitude of the change of the detection signal S(t) at a given point in time, i.e. at a given radial position, is approximately proportional to the electron current density distribution integrated in azimuthal direction at this given radial position. Thus, the magnitude of the continuous elongated drop, i.e. the distribution of the magnitude of the change of the detection signal depending on different points in time, i.e. on different radial positions, is approximately proportional to the focal spot length current distribution. Therefore, if the correction factors are determined by known calibration steps (e.g. see the following section) the focal spot length current distribution can be determined depending on the magnitude of the change of the detection signal. If the spiral lead is steep instead, the characteristics of utilizing such kind of groove approach those of a radial slit or a radial groove.

The determination of the properties of the focal spot can be calibrated by measuring the properties of the focal spot by other means, e.g. the x-ray blackening of film in a pin hole or slit camera (for details see the IEC 60336 standard). The latter method is generally used to verify with a restricted set of operating conditions, i.e. technique factors, that the tube is performing as specified. By comparing the properties of the focal spot measured by the other means with the properties of the focal spot as determined according to the invention, the output reading of the determination means, i. e. the result of the measurement according to the invention, can be calibrated. For example, constants described in this description, like the constant of equation (6), proportional factors and further calibration parameters can be determined.

In a preferred embodiment the width of one slit of the anode 5 is significantly larger than the width of the other slits to allow for a clear phase detection of the anode. As by this synchronisation, the dips of the detection signal can be associated with the individual structures on the anode and the control unit "knows" which structure creates a certain dip, larger tolerances of pit and slit position and size can be allowed without introducing fluctuations of the signals, e.g. when a sampling of the signal is applied. This makes the cutting of the anode easier.

For calibration purposes and to enhance the accuracy of the determination, an auxiliary primary electron beam can be used, which has preferably a small width of 0. 1 to 0.2 mm, and the width of the slits can be determined by using this auxiliary beam. For that purpose, an extra cathode creates a focal spot, wherein the width of this focal spot is smaller than the slit width. The probe function is then the intensity distribution of the auxiliary beam, and the width of the slits is measured. Referring to FIG. 7, the width of a slit 29 passing the focal spot corresponds to the time period $\tau_s$ of the detection signal 30 multiplied with the angular frequency of rotation and the radius of the focal track $r_t$ being the distance between the axis of rotation 14 and the center of the focal spot 27.

The height of the background signal of the detection signal depends on the high voltage ripple of the high-voltage source 10. The high-voltage ripple is measured in the high-voltage source 10 and fed back to the control unit for correction. In case of x-ray photons, for correction the formula $S_0(t) = \text{const}\cdot U^f(t)$ can be used. The power f depends on the radiation filtering between the focal spot 27 and the detection surface of the detector 7. For zero filtration, f is about 2. If a detector with an attenuating filter is used, the power f can be calculated using a best fit method, e.g. f and the constant are varied until a best fit is reached for different high voltage settings U(t). Once the constant and the power f are determined during a calibration step, $S_0(t)$ is deducted from the measured signal S(t) for operation.

To further improve the measurement of the background signal of the detection signal, an auxiliary background detector may be placed such that its line of sight reaches to the bottom of the slits and pits. The probability of reaching the auxiliary background detector is substantially equal for particles emitted from the pits and grooves upon passage of the focal spot and for those emitted from the top surface 9 of the anode 5. The background signals of the background detector can be subtracted from the detection signals of the detector 7. This allows for background signal deduction particularly for the weak pit signals. It further allows for a deduction of background "noise" created by rough spots and other irregularities in the target surface, i.e. the top surface 9 of the anode 5, which may be created over the lifetime of the tube.

The structure 15 on the anode 5 can also be used to determine properties of the anode 5 which will be explained in the following.

The time period, during which a dip of the detection signal caused by a slit is detected, depends on the width of the slit, in particular, if the width of the slit is much smaller than the width of the focal spot, this time period is approximately proportional to the slit width. The width of the slit depends on the temperature of the anode, because, when the temperature increases, the anode will extend resulting in a shrinkage of the slit width in the area of the surface where the focal spot is disposed. Thus, the time period, during which a dip of the detection signal caused by a slit is detected, is a direct measure for the temperature gradient between the area of the surface 9 where the focal spot 27 is disposed and the rest of the anode.

The thermal strain (TS) defined as the shrinkage of the width of a slit in the anode can be determined according to following equation:

$$TS=\text{const}\cdot\int(S_s(t,T_a)-S_0)dt/\int(S_s(t,T_r)-S_0)dt, \quad (8)$$

integrated over the time of passage of the respective slit, wherein $S_s(t, T_a)$ is the detection signal caused by a slit at the current temperature $T_a$ and wherein $S_s(t, T_r)$ is the detection signal caused by a slit at a reference temperature $T_r$.

In order to detect the shrinkage, the shrinkage ratio (slit width in cold condition to slit width in hot condition) should be large. Therefore, the slit should be so narrow, that it nearly shrinks to zero width for the maximum occurring temperature. As this kind of slit does not produce a proper beam detection signal in hot condition, only one of the slits in the anode should be cut with a size, which is suitable for this particular measurement.

It is well known that anodes tend to develop deformations like bending up and down during the lifetime of the tube. By monitoring the slit dimensions this kinds of ageing can be detected, as the slit dimensions will change, and a message can be generated to prepare for an x-ray tube change or other preventive activities. This monitoring is performed by measuring the temporal width and/or the magnitude of the detection signals for the slits of a used tube and comparing them with the corresponding stored values measured for the new tube. If stored and current temporal widths and/or magnitudes of the detection signal differ by more than a predefined threshold value, ageing is detected and a message can be generated. A deviation of more than 5 percent, preferably of more than 10 percent and further preferably of more than 20 percent, is an indication of significant ageing.

Although the invention is described with respect to a focal spot with a substantially oval shape, the invention is not limited to this specific shape. Other shapes of the focal spot, e.g. circular shapes, are also included by the invention.

Although the invention is described with respect to a structure having slits, pits and grooves which are arranged on the anode in a specific way, other structures are also within the scope of the invention.

Although the invention is described mainly with reference to changes of the detection signal caused by x-ray photons, the invention includes the use of any change of the detection signal caused by the structure, in particular caused by a change of the intensity of currents of particles, e.g. electrons, vaporized metal particles etc., emanating from the focal spot caused by the structure.

Although the invention is described with reference to the use of the x-ray tube in a computed tomograph, the x-ray tube according to the invention can also be used in other devices, e.g. in a C-arm device and other radiographic equipment for medical and non-medical use.

Although the determination of the properties of the focal spot is mainly discussed under the assumption that the slit width and the radius of the pits are much smaller than the width of the focal spot, the determination disclosed in this description can also be used, in good approximation, in cases, in which the slit width and the radius of the pits are not much smaller than the width of the focal spot, e.g. in cases, in which the slit width and/or the radius of the pits and the width of the focal spot are almost the same or in cases, in which the slit width and/or the radius of the pits are only two times, three times or five times smaller than the widths of the focal spot.

Although the determination of the properties of the focal spot has been discussed in several parts of the description under further assumptions, the described determinations of the properties of the focal spot can also be applied, in good approximation, if these assumptions are not fulfilled.

The invention claimed is:

1. An x-ray tube comprising:

a) a rotating anode having at least one structure for determining a property of a focal spot, wherein the structure is selected from a radial slit, a radial groove, a single pit, a series of pits that are offset to each other in radial and azimuthal direction, a spiral groove, a grooved spiral line, a slit with varying width in radial direction, and a groove with varying width in radial direction;

b) at least one cathode for emitting electrons that are accelerated towards the rotating anode such that the electrons impinge on the surface of the rotating anode and form the focal spot;

wherein the x-ray tube is adapted to produce a detection signal S(t) that changes when the structure on the rotating anode passes the focal spot.

2. The x-ray tube of claim 1, wherein the property is the focal spot width current distribution.

3. The x-ray tube of claim 1, wherein the slit with varying width in radial direction has a triangular shape.

4. The x-ray tube of claim 1, wherein the slit with varying width in radial direction has a double triangular shape.

5. The x-ray tube of claim 1, wherein the single pit is elongated in radial direction.

6. The x-ray tube of claim 1, wherein the spiral groove is adapted so that the change in the detection signal S(t) is proportional to the length of the focal spot.

7. The x-ray tube of claim 1, further comprising an auxiliary primary electron beam and an extra cathode for determining the width of slits.

8. A computer tomograph system comprising an x-ray tube as claimed in claim 1.

9. A method for determining a property of a focal spot of an x-ray tube, the x-ray tube having a rotating anode and a cathode, the method comprising the steps of:

a) rotating the anode, wherein the anode has a structure for generating a detection signal S(t) that changes when the structure on the rotating anode passes the focal spot, the structure comprising a radial slit, a radial groove, a single pit, a series of pits that are offset to each other in radial and azimuthal direction, a spiral groove, a grooved spiral line, a slit with varying width in radial direction, or a groove with varying width in radial direction;

b) emitting electrons from the cathode and accelerating the electrons towards the rotating anode such that the electrons impinge on the surface of the rotating anode and form the focal spot;

c) detecting the detection signal S(t); and d) determining the property of the focal spot from changes of the detection signal S(t).

10. The method of claim 9, wherein the property is the focal spot width current distribution.

11. A computer configured to determine a property of a focal spot on a rotating anode of an x-ray tube, the x-ray tube having a rotating anode and a cathode, the computer configured to control the steps of:

a) rotating the anode, wherein the anode has a structure for generating a detection signal S(t) that changes when the structure on the rotating anode passes the focal spot, the structure comprising a radial slit, a radial groove, a single pit, a series of pits that are offset to each other in radial and azimuthal direction, a spiral groove, a grooved spiral line, a slit with varying width in radial direction, or a groove with varying width in radial direction;

b) emitting electrons from the cathode and accelerating the electrons towards the rotating anode such that the electrons impinge on the surface of the rotating anode and form the focal spot;

c) detecting the detection signal S(t); and d) determining the property of the focal spot from changes of the detection signal S(t).

12. The computer of claim 11, wherein the property is the focal spot width current distribution.

13. A computer readable storage medium comprising instructions for performing a method for determining a property of a focal spot on a rotating anode of an x-ray tube, the x-ray tube having a rotating anode and a cathode, the method comprising:

a) rotating the anode, wherein the anode has a structure for generating a detection signal S(t) that changes when the structure on the rotating anode passes the focal spot, the structure comprising a radial slit, a radial groove, a single pit, a series of pits that are offset to each other in radial and azimuthal direction, a spiral groove, a grooved spiral line, a slit with varying width in radial direction, or a groove with varying width in radial direction;

b) emitting electrons from the cathode and accelerating the electrons towards the rotating anode such that the electrons impinge on the surface of the rotating anode and form the focal spot;

c) detecting the detection signal S(t); and d) determining the property of the focal spot from changes of the detection signal S(t).

14. The computer readable storage medium of claim 13, wherein the property is the focal spot width current distribution.

* * * * *